(12) United States Patent
Kubota

(10) Patent No.: US 7,797,568 B2
(45) Date of Patent: Sep. 14, 2010

(54) RELAY AGENT DEVICE AND PROXY ADDRESS LEASING DEVICE

(75) Inventor: Makoto Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 430 days.

(21) Appl. No.: 11/836,915

(22) Filed: Aug. 10, 2007

(65) Prior Publication Data

US 2008/0065747 A1    Mar. 13, 2008

(30) Foreign Application Priority Data

Sep. 11, 2006   (JP) ............................. 2006-245744

(51) Int. Cl.
    *G06F 11/00* (2006.01)
(52) U.S. Cl. .......................................................... 714/4
(58) Field of Classification Search ...................... 714/4, 714/43
    See application file for complete search history.

(56) References Cited

U.S. PATENT DOCUMENTS

| | | | | |
|---|---|---|---|---|
| 2004/0111640 A1* | 6/2004 | Baum | ........................ | 713/201 |
| 2005/0074015 A1* | 4/2005 | Chari et al. | .................. | 370/400 |
| 2005/0198344 A1* | 9/2005 | Fujita | .......................... | 709/231 |
| 2005/0271049 A1* | 12/2005 | Jain et al. | .................... | 370/389 |
| 2007/0002761 A1* | 1/2007 | Diamant et al. | ............. | 370/252 |
| 2007/0002833 A1* | 1/2007 | Bajic | ........................... | 370/352 |
| 2007/0127506 A1* | 6/2007 | Absillis | ....................... | 370/401 |
| 2007/0147299 A1* | 6/2007 | Ando et al. | ................... | 370/331 |
| 2008/0026692 A1* | 1/2008 | Kojima | ........................... | 455/7 |
| 2008/0183769 A1* | 7/2008 | Regan et al. | ................. | 707/201 |
| 2008/0183812 A1* | 7/2008 | Paul et al. | .................... | 709/203 |
| 2008/0281973 A1* | 11/2008 | Yang | ........................... | 709/228 |
| 2009/0207819 A1* | 8/2009 | Kroselberg et al. | ......... | 370/338 |
| 2009/0296567 A1* | 12/2009 | Yasrebi et al. | .............. | 370/221 |
| 2010/0034130 A1* | 2/2010 | So et al. | ...................... | 370/312 |
| 2010/0048161 A1* | 2/2010 | He et al. | ................... | 455/404.1 |
| 2010/0131660 A1* | 5/2010 | Dec et al. | .................... | 709/228 |

FOREIGN PATENT DOCUMENTS

JP        2001-230788        8/2001

* cited by examiner

*Primary Examiner*—Bryce P Bonzo
(74) *Attorney, Agent, or Firm*—Katten Muchin Roseman LLP

(57) ABSTRACT

A relay agent device disposed in one of a plurality of networks each accommodating a terminal and an address leasing device performing an address lease service for the terminal, has a notifying unit notifying a proxy address leasing device, employed in common between the plurality of networks, of an address lease state of the address leasing device with respect to the terminal, a detecting unit detecting a fault in the address leasing device, and a transfer unit transferring a message related to the address lease, which is sent from the terminal, to the proxy address leasing device in order for the proxy address leasing device to take over an IP address lease service provided by the address leasing device when the fault is detected, and transferring a message related to the address lease, which is addressed to the terminal from the proxy address leasing device, to the terminal.

15 Claims, 22 Drawing Sheets

Fig.6

| | |
|---|---|
| Op | OPERATION CODE (1=BOOTREQUEST, 2=BOOTREPLY) |
| htype | HARDWARE NUMBER |
| hlen | HARDWARE/ADDRESS LENGTH |
| hops | TRANSFER HOP COUNT ("0" IS DESIGNATED FOR CLIENT) |
| xid | TRANSACTION ID (RANDOM NUMBER DETERMINED BY CLIENT PER TRANSACTION) |
| secs | ELAPSE TIME SINCE CLIENT TERMINAL STARTED INITIALIZING |
| flags | FLAG |
| ciaddr | IP ADDRESS OF CLIENT TERMINAL (IF ALREADY HAVING IP ADDRESS) |
| yiaddr | IP ADDRESS ASSIGNED TO CLIENT TERMINAL |
| siaddr | SHOULD-BE-USED IP ADDRESS FOR INITIALIZATION OF NEXT TIME |
| giaddr | IP ADDRESS OF RELAY AGENT |
| chaddr | MAC ADDRESS OF CLIENT TERMINAL |
| sname | HOST NAME OF SERVER |
| file | BOOT FILE NAME |
| options | LEASE PERIOD ETC |

Fig.9

| yiaddr | IP ADDRESS ASSIGNED TO CLIENT TERMINAL |
| --- | --- |
| giaddr | IP ADDRESS OF RELAY AGENT |
| chaddr | MAC ADDRESS OF CLIENT TERMINAL |
| lease time | LEASE PERIOD |

Fig.11

| IP ADDRESS OF RELAY AGENT | IP ADDRESS POOL SPACE |
|---|---|
| 192.168.0.1 | 192.168.0.2～9 |
| 192.168.1.1 | 192.168.1.2～9 |
| 192.168.2.1 | 192.168.2.2～9 | ered to the proxy address leasing device of an address lease state of the address
RELAY AGENT DEVICE AND PROXY ADDRESS LEASING DEVICE

BACKGROUND OF THE INVENTION

1. Field of the Invention

The present invention relates to a DHCP server function and redundancy of a device.

2. Description of the Related Art

LANs (Local Area Networks) have involved utilizing DHCP (Dynamic Host Configuration Protocol, RFC2131) in many cases over the recent years. The DHCP is a protocol for automating assignment of an IP (Internet Protocol) address to a terminal. To be specific, the DHCP is frequently used for in-office/in-home LANs, xDSL (x Digital Subscriber Line), the Cable Internet, etc.

An operation of the present protocol (DHCP) is based on intra-subnet broadcast so that the terminal can operate without being aware of an IP address of a DHCP server. Namely, the following operations are performed.

(1) A client terminal, which does not yet acquire the IP address, broadcasts an IP address assignment request DHCP packet to the subnet; and (2) The DHCP server detecting the DHCP packet assigns the IP address the requester terminal.

The present protocol (DHCP) has a problem, wherein an end user/system administrator is released from a labor for address management/setup, while the terminal gets disabled to acquire the IP address (IP address acquisition-disabled state) when the DHCP server gets into a fault. Herein, the [IP address acquisition-disabled state] connotes a [network unusable state]. This state causes, for example, a stop of operation in an enterprise, and it is therefore of importance to take a redundancy measure of the DHCP server.

FIGS. 16 and 17 are diagrams showing conventional DHCP operation modes. The conventional DHCP operation modes are roughly categorized into the following two operation modes.

<1> The single DHCP server is disposed in each subnet (FIG. 16).

<2> The single DHCP server used in common in the whole networks is disposed, and a relay Agent is allocated to each subnet (FIG. 17).

FIG. 18 is a diagram showing configurations of the relay Agent and of the common DHCP server in the operation mode <2>. A relay Agent 130 has a DHCP transferring unit 236. The DHCP transferring unit 236 relays the DHCP packet between a subnet 105 and a common DHCP server 140. Further, the common DHCP server 140 includes a common DHCP server unit 246 and an in-use address management database 248. The common DHCP server unit 246 assigns an IP address in response to an IP address assignment request.

The operation mode <2> has a problem that lowness of the response due to WAN (Wide Area Network) and Internet existing between the terminal and the server is directly visible to the user as compared with the operation mode <1>. Hence, the operation mode <1> is normally taken in many cases.

FIG. 19 is an operation sequence diagram of a DHCP operation mode in the operation mode <1> described above.

A terminal 120 sends a Discover message to the DHCP server 110 in order to probe the assignment of the IP address. Then, the DHCP server 110 sends an Offer message to the terminal 120. The terminal 120 receiving the Offer message sends a Request message for requesting the IP address to the DHCP server 110. The DHCP server 110 sends an ACK message to the terminal 120, and notifies the terminal 120 of the IP address and a lease start time/lease period. Each of the Discover message, the Offer message, the Request message and the ACK message is transmitted by broadcast.

On the occasion of extending the lease period, the terminal 120 sends the Request message for requesting an extension of the lease period of the IP address to the DHCP server 110. The DHCP server 110 sends the ACK message to the terminal 120 and notifies the terminal 120 of a renewed lease period. The Request message and the ACK message are transmitted by unicast. Therefore, these messages are invisible to other devices.

FIG. 20 is an operation sequence diagram of the DHCP operation mode in the operation mode <2> described above.

A flow of information between the terminal 120 and the common DHCP server 140 is the same as the flow of information between the terminal 120 and the DHCP server 110 in the operation mode <1> described above. The common DHCP server 140 does not, however, exist on the subnet 105 for the terminal 120, and hence the relay Agent 130 relays the communications between the terminal 120 and the common DHCP server 140. The communications between the relay Agent 130 and the common DHCP server 140 are performed by unicast.

FIGS. 21 and 22 are diagrams showing conventional DHCP server redundancy approaches. The following two approaches correspond to the two operation modes described above.

<1> Two DHCP servers are installed in each LAN and are switched over when the fault occurs (FIG. 21).

<2> Two common DHCP servers are installed in the network and are switched over when the fault occurs (FIG. 22).

The approach <1> is an approach utilized as the conventional technique in the network of which high reliability is required. This approach <1>, however, involves installing the servers by twos for redundancy in each LAN. Therefore, this configuration turns out a large load in cost on the administrator.

The approach <2> is an approach unrealizable at the present. Namely, the relay Agent at the present has neither the fault detecting function nor the switchover function for the common DHCP servers after the detection, and therefore the approach <2> can not be actualized. Even if actualized, as described above, the original mode is a mode of disposing one DHCP server used in common. Accordingly, the lowness of response till the acquisition of the address appears to be irrespective of the redundancy at all times. This point is a problem.

[Patent document 1] Japanese Patent Application Laid-Open Publication No. 2001-230788

SUMMARY OF THE INVENTION

It is an object of the present invention to actualize the redundancy of the DHCP server by restraining a cost for adding server equipment without decreasing a response of acquisition of the IP address when operated normally as compared with the mode of disposing the DHCP server in each subnet.

The present invention adopts the following means in order to solve the problems.

Namely, the present invention is a relay agent device disposed between one of a plurality of networks each accommodating terminals and an address leasing device performing an address lease service for the terminals and a proxy address leasing device used in common between the plurality of networks, comprising a notifying unit notifying the proxy address leasing device of an address lease state of the address leasing device with respect to the terminal, a detecting unit detecting a fault in the address leasing device, and a transfer unit transferring a message related to the address lease, which is sent from the terminal, to the proxy address leasing device in order for the proxy address leasing device to take over an IP address lease service provided by the address leasing device when the fault is detected, and transferring a message related to the address lease, which is addressed to the terminal from the proxy address leasing device, to the terminal.

According to the present invention, if the fault occurs in the address leasing device and even when any substitute address leasing device does not exist in the same network, the proxy address leasing device used in common between the plurality of networks can take over the address lease service.

Further, the present invention is a proxy address leasing device connected via a relay agent device to a network accommodating terminals and an address leasing device providing an address lease service to the terminals, comprising a learning unit learning, if a fault does not occur in the address leasing device, an address lease state of the address leasing device with respect to the terminal, which is transferred from the relay agent device, a storage unit stored with the address lease state, and a proxy unit taking over the address lease service of the address leasing device by performing communications for leasing the address with the terminal via the relay agent device on the basis of learning contents of the learning unit and the address lease state in the storage unit.

According to the present invention, if the fault occurs in the address leasing device in a certain network, it is possible to take over the address lease service.

EFFECTS OF THE INVENTION

According to the present invention, it is feasible to actualize the redundancy of the DHCP server by restraining the cost for adding the server equipment without decreasing the response of acquisition of the IP address when operated normally as compared with the mode of disposing the DHCP server in each subnet.

BRIEF DESCRIPTION OF THE DRAWINGS

FIG. 6 is a table showing definitions of respective fields of the DHCP message format.

FIG. 9 is a table showing definitions of respective fields of the message format of the in-use address notifying message.

FIG. 11 is a diagram showing an example of definition of an IP address pool space.

DETAILED DESCRIPTION OF THE INVENTION

Embodiments of the present invention will hereinafter be described with reference to the drawings. Configurations in the embodiments are exemplifications, and the present invention is not limited to the configurations in the embodiments.

First Embodiment

<Network Architecture>

Figure 1:
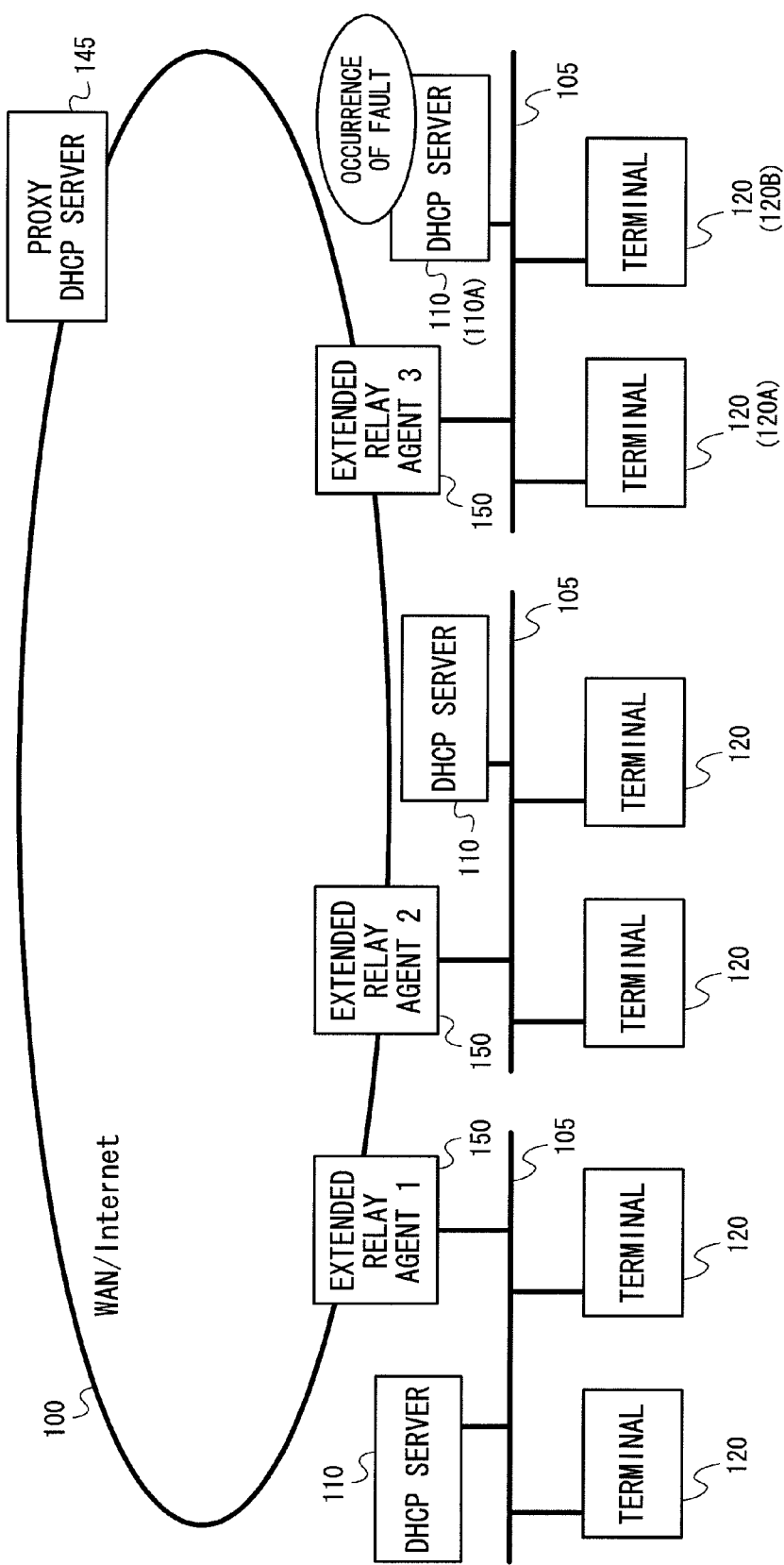
FIG. 1 is a diagram showing an example of a network architecture in a first embodiment.

FIG. 1 is a diagram illustrating a network architecture in the present embodiment. A proxy DHCP server 145 and one or a plurality of extended relay Agents 150 are connected to a WAN (or Internet) 100. A subnet (LAN) 105 is connected via the extended relay Agent 150 to the WAN 100. A DHCP server 110 and a terminal 120 are connected to the subnet 105.

The DHCP server 110 on each subnet 105 is the same as the conventional DHCP server, and operates as an active system. The proxy DHCP server 145 is an extended version of the conventional common DHCP server, and operates as a standby system.

Each extended relay Agent 150 on the subnet 105 is an extended version of the conventional relay Agent.

Each of a relay Agent device and a proxy address leasing device includes the extended relay Agent 150 and the proxy DHCP server 145 in the present embodiment.

<Extended Relay Agent and Proxy DHCP Server>

Figure 2:
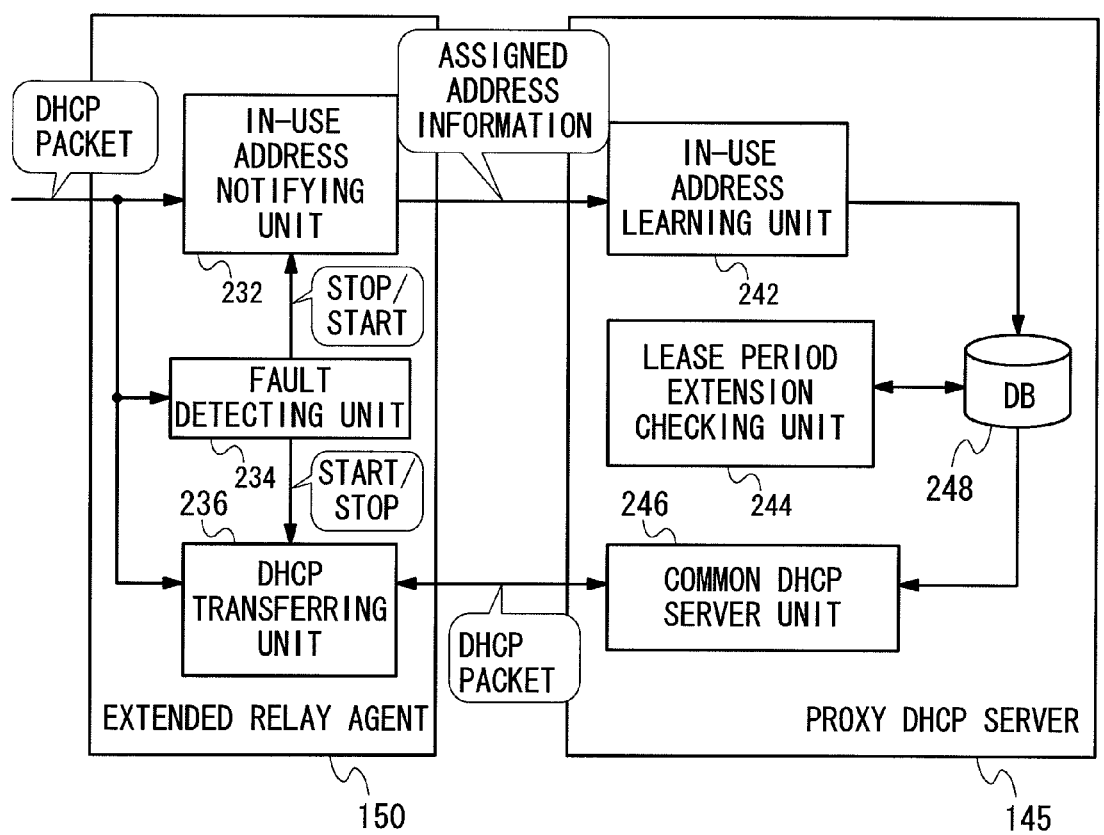
FIG. 2 is a diagram showing an example of configurations of an extended relay Agent and a proxy DHCP server in the first embodiment.

FIG. 2 is a diagram showing the extended relay Agent 150 and the proxy DHCP server 145 in the present embodiment.

(Extended Relay Agent)

The extended relay Agent 150 includes an in-use address notifying unit 232, a fault detecting unit 234 and a DHCP transferring unit 236.

Each of a notification unit, a detection unit and a transfer unit according to the present invention includes the in-use address notifying unit 232, the fault detecting unit 234 and the DHCP transferring unit 236 in the present embodiment.

The in-use address notifying unit 232 monitors a DHCP packet that is transferred and received by broadcast on the LAN. The DHCP packet is a packet for a Discovery message, an Offer message, a Request message and an ACK message. The in-use address notifying unit 232 notifies the proxy DHCP server 145 of information of an already-assigned IP address leased to the terminal 120 from the DHCP server 110 on the LAN. The assigned IP address information contains an IP address assigned to the terminal 120, IP address lease start time, an IP address lease period, a MAC (Media Access Control) address of the terminal 120, etc.

The fault detecting unit 234 monitors the DHCP packet transferred and received by broadcast. The fault detecting unit 234 monitors whether a fault occurs in the DHCP server 110 or not, thus detecting the fault. The fault detecting unit 234 monitors whether or not an Offer response to the Discovery message coming from the terminal 120 is given from the DHCP server 110, and whether or not an ACK response to the Request message coming from the terminal 120 is given from the DHCP server 110. The fault detecting unit 234 determines, if none of the response is given from the DHCP server 110 to the terminal 120 for a fixed period of time, that the fault occurs in the DHCP server 110, and thus detects the fault of the DHCP server 110. Further, the fault detecting unit 234 continues to monitor on the LAN even after detecting the fault. The fault detecting unit 234, upon confirming resumption of the response from the DHCP server 110 to the terminal 120, detects that the DHCP server 110 on the LAN has been recovered.

The DHCP transferring unit 236 transfers the DHCP packet between the terminal 120 and the proxy DHCP server 145. The DHCP transferring unit 236 has the same function as the existing relay Agent has.

It should be noted that the in-use address notifying unit 232 and the fault detecting unit 234 are defined as novel or improved configurations implemented in the existing relay Agent in order to actualize the present invention.

(Proxy DHCP Server)

The proxy DHCP server 145 includes an in-use address learning unit 242, a lease period extension checking unit 244, a common DHCP server unit 246, an in-use address management database 248.

The in-use address management database 248 is a database (DB) that manages the DHCP-based assigned IP addresses. The in-use address management database 248 is the same as the existing DHCP and the common DHCP server have.

The in-use address learning unit 242 stores, in the in-use address management database 248, the assigned IP address information of which the in-use address notifying unit 232 of the extended relay Agent 150 notifies, as an IP address in-use state of the notification-source LAN.

The lease period extension checking unit 244 sends a query message (Ping) for checking whether the IP address of which a lease period expired is in use or not. If no response to this query message is given, it is determined that the lease period expired, and the in-use address management database 248 is updated. Whereas if a response is given, it is determined that the lease period extends, and the in-use address management database 248 is updated.

The common DHCP server unit 246 has the same function as the existing common DHCP server has.

The in-use address learning unit 242 and the lease period extension checking unit 244 in the proxy DHCP server 145 correspond to novel or improved configurations for actualizing the present invention.

<Outline of Operation>
(Pre-Occurrence of Fault)

Before the fault occurs, in the extended relay Agent 150, the fault detecting unit 234 monitors and detects as to whether or not the fault occurs in the DHCP server on the same LAN.

Further, in the extended relay Agent 150, the in-use address notifying unit 232 notifies the proxy DHCP server 145 of the IP address in-use state of the DHCP server 110 on the same LAN.

In the proxy DHCP server 145, when notified of the IP address in-use state, the in-use address learning unit 242 learns the IP address in-use state.

According to the DHCP specifications, an extension request/response of the lease period of the once-leased IP address is made by unicast. Therefore, the in-use address notifying unit 232 recognizes but is unable to notify the extension of the lease period of the leased IP address. This being the case, in the proxy DHCP server 145, the lease period extension checking unit 244 checks whether the terminal 120 has renewed the lease period or not, and updates, based on a result of checking, the in-use address management database 248.

(Post-Occurrence of Fault)

An assumption is that the fault occurs in the DHCP server 110 on the LAN. In the extended relay Agent 150, the fault detecting unit 234 detects the occurrence of the fault. The fault detecting unit 234 instructs the proxy DHCP server 145 to start forwarding the DHCP packet. Further, the fault detecting unit 234 instructs the in-use address notifying unit 232 to stop notifying the in-use address learning unit 242 of the assigned address information. It is because after the occurrence of the fault, the proxy DHCP server 145 itself assigns the IP address, and hence it is unnecessary for the extended relay Agent 150 to repeatedly notify of the IP address in-use state.

The proxy DHCP server 145 takes over the subsequent DHCP server process by use of the in-use address management database 248 built up by the in-use address learning unit 242 and the lease period extension checking unit 244.

(Post-Recovery from Fault)

It is assumed that the DHCP server 110 on the LAN is recovered from the fault. In the extended relay Agent 150, the fault detecting unit 234 detects the recovery from the fault. The fault detecting unit 234 instructs the DHCP transferring unit 236 to stop transferring the DHCP packet to the proxy DHCP server 145. Further, the fault detecting unit 234 instructs the in-use address notifying unit 232 to start notifying the in-use address learning unit 242 of the assigned address information.

Hereafter, the same operation as before the occurrence of the fault is performed.

<Details of Operation>

Figure 3:
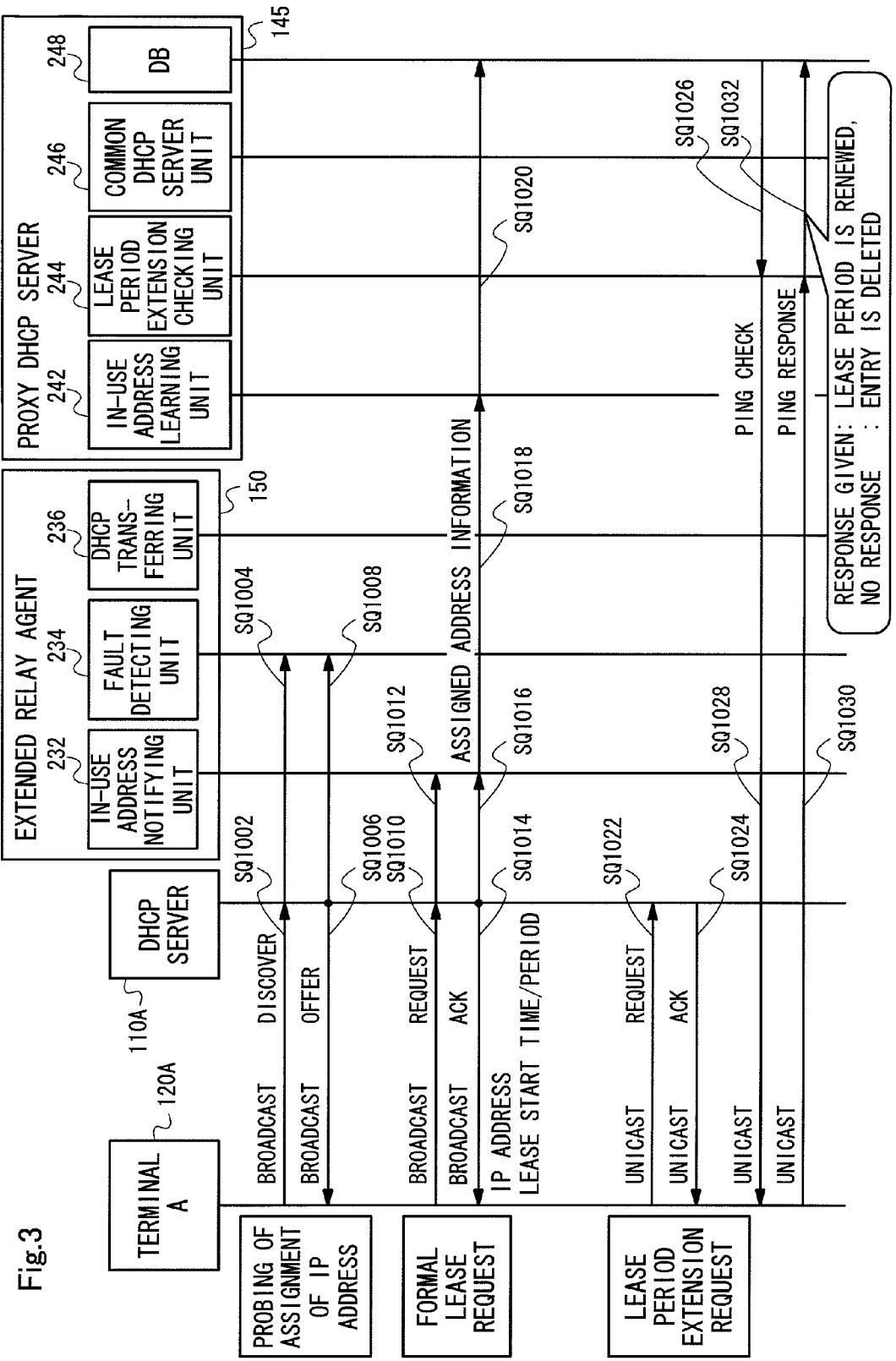
FIG. 3 is a diagram showing an operation sequence (pre-occurrence of fault) in the first embodiment.
Figure 4:
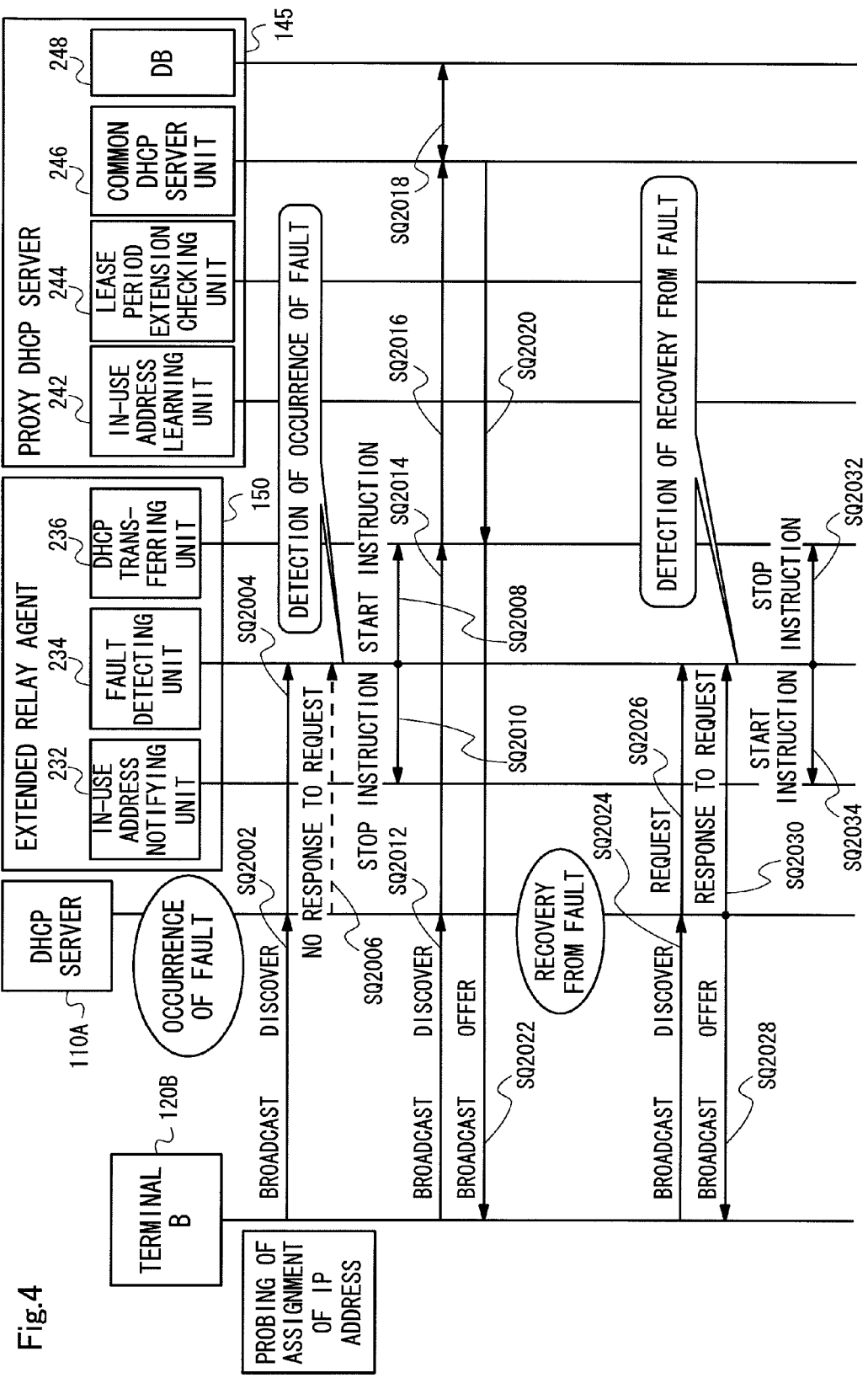
FIG. 4 is a diagram showing an operation sequence (post-occurrence of fault) in the first embodiment.

FIGS. 3 and 4 are sequence diagrams of the operation in the present embodiment. An operational example of the present embodiment will be described in depth with reference to the drawings. The description will be given in the way of being itemized into [Pre-Occurrence of Fault], [Post-Occurrence of Fault] and [Post-Recovery from Fault].

(Pre-Occurrence of Fault)

An existing DHCP server 110A on a certain LAN illustrated in FIG. 1 makes a response to an IP address assignment request given from a terminal A (120A). To be specific, the DHCP server 110A, when receiving a DHCP Discovery message (SQ1002), makes a response by a DHCP Offer message (SQ1006). Further, the DHCP server 110A, when receiving a DHCP Request message (SQ1010), makes a response by a DHCP ACK message (SQ1014). These messages are sent and received all by broadcast in the form of packets addressed to UDP-based (User Datagram Protocol based) ports 67 and 68.

Figure 5:
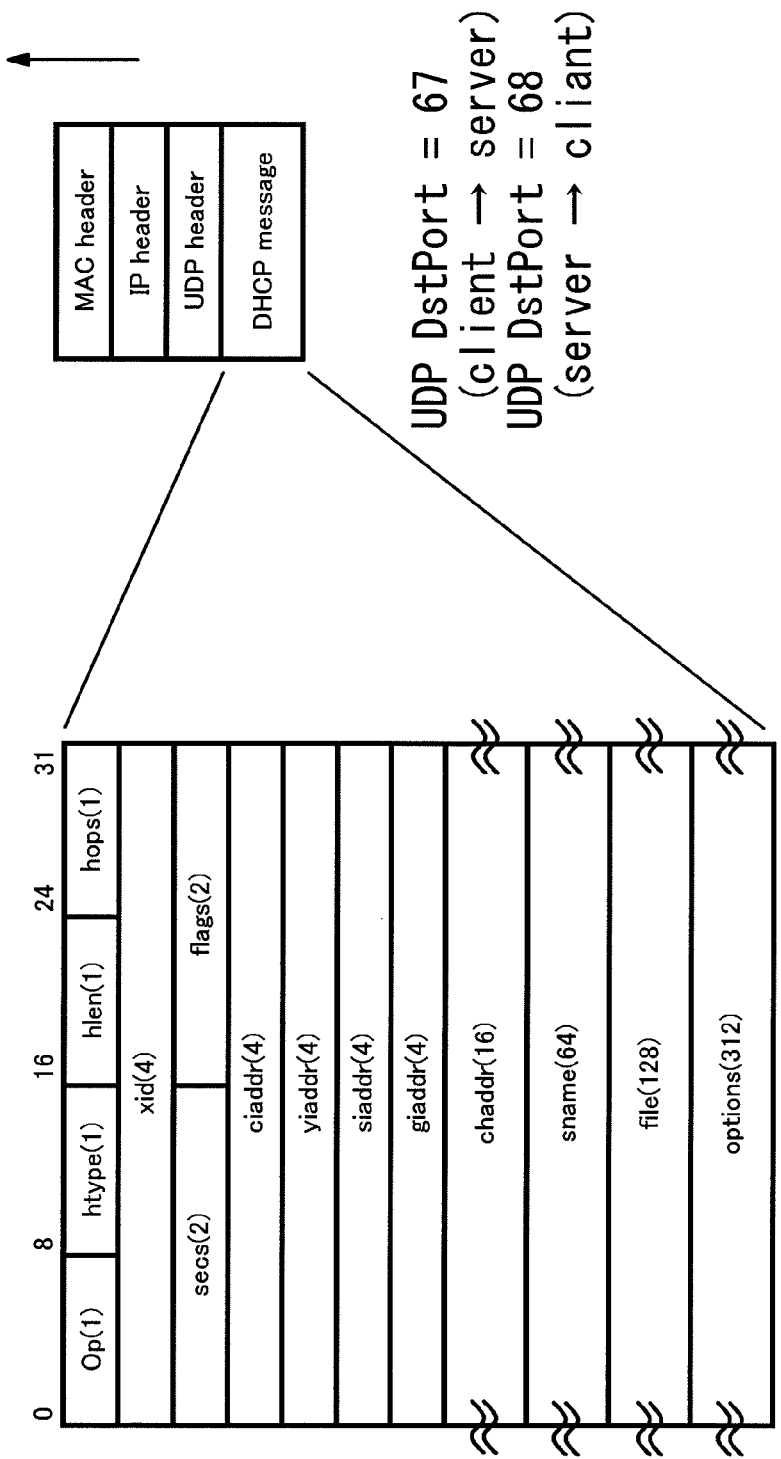
FIG. 5 is a diagram of a DHCP message format.

FIG. 5 is a diagram showing a DHCP message format. FIG. 6 is an explanatory table showing definitions of respective fields in the DHCP message format. The DHCP message format has fields such as Op. htype, hlen, hops, xid, secs, flags, ciaddr, yiaddr, siadder, giaddr, chaddr, sname, file and options.

Figure 7:
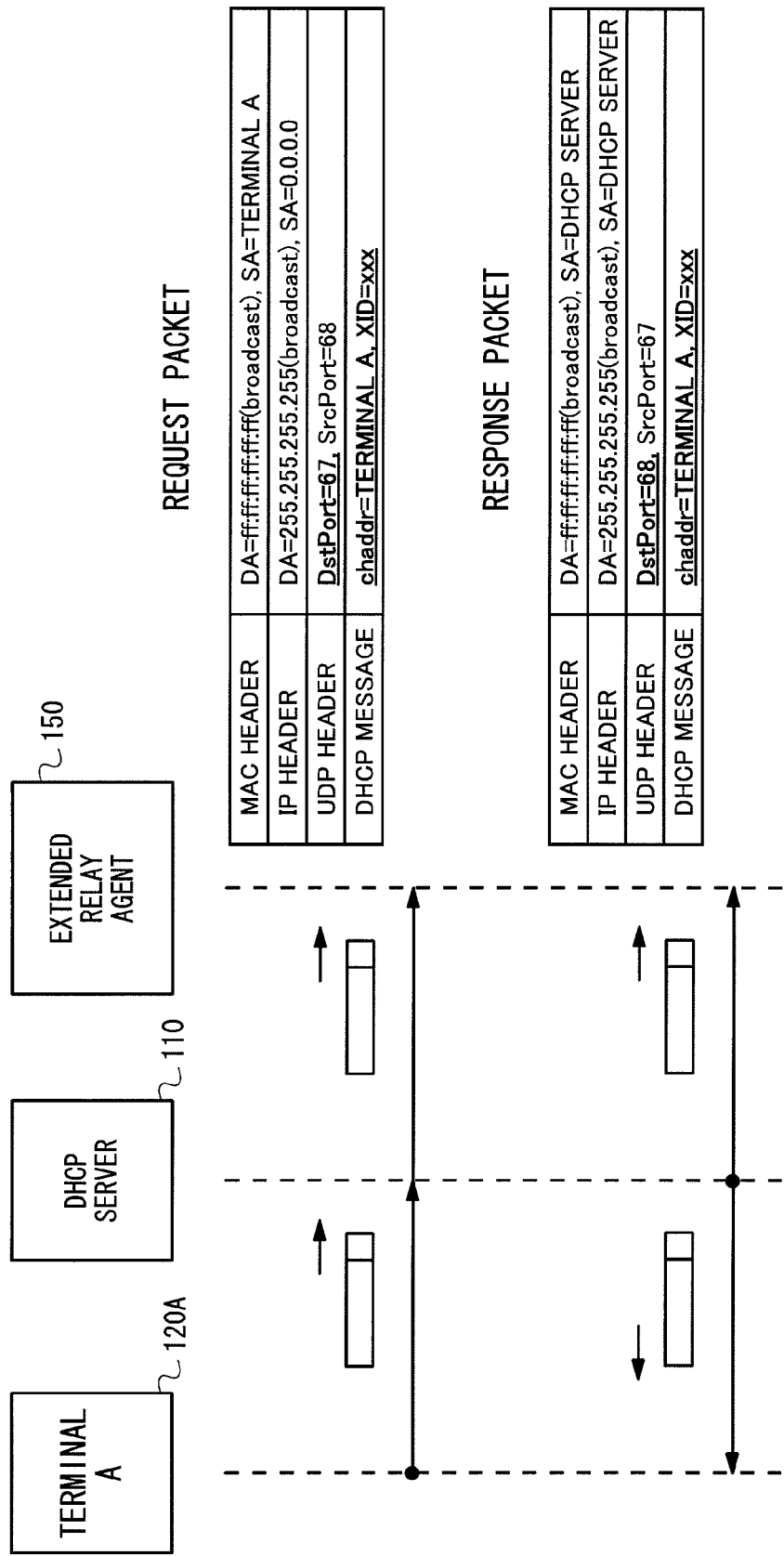
FIG. 7 is a diagram showing a monitoring target field for detecting a fault.

Referring back to FIG. 3, the fault detecting unit 234 of the extended relay Agent 150 on the same LAN monitors whether or not the DHCP server 110A gives the response to the terminal A (120A) while observing the payload field of the DHCP packet (SQ1004, SQ1008). FIG. 7 is a diagram showing a monitoring target field for detecting the fault. The fault detecting unit 234 monitors DstPort in a UDP header of the DHCP packet, and also monitors chadder and xid in the DHCP message.

The extended relay Agent 150 including the fault detecting unit 234 recognizes the packet (request packet) addressed to the DHCP server 110A from UDP DstPort=67. The extended relay Agent 150 recognizes the packet (response packet) addressed to a DHCP client from UDP DstPort=68. The determination that the packet is the response packet to the request given from the terminal A (120A), is made by determining coincidences in the chaddr field and in the xid field. The chaddr field specifies a MAC address of the client terminal. The xid field specifies a transaction ID (which is a random number decided by the client for every transaction). If any response is given, it is determined that there is no fault, and, whereas if none of the response is given, it is determined that the fault occurs.

Further, the in-use address notifying unit 232 in the same extended relay Agent 150 similarly monitors the request/response of the DHCP packet (SQ1012, SQ1016). The monitoring target field for knowing the in-use IP address is the same as in the example in FIG. 7. The in-use address notifying unit 232 monitors DstPort in the YDP header of the DHCP packet, and also monitors the chaddr field and the xid field of the DHCP message.

The extended relay Agent 150 having the in-use address notifying unit 232 recognizes the packet (request packet) addressed to the DHCP server 110A from UDP DstPort=67. The extended relay Agent 150 recognizes the packet (response packet) addressed to the DHCP client from UDP DstPort=68. The determination that the packet is the response packet to the request given from the terminal A (120A), is made by determining the coincidences in the chaddr field and in the xid field. The IP address and the lease period are extracted from the yiaddr field and the option field in the response message.

Figure 8:
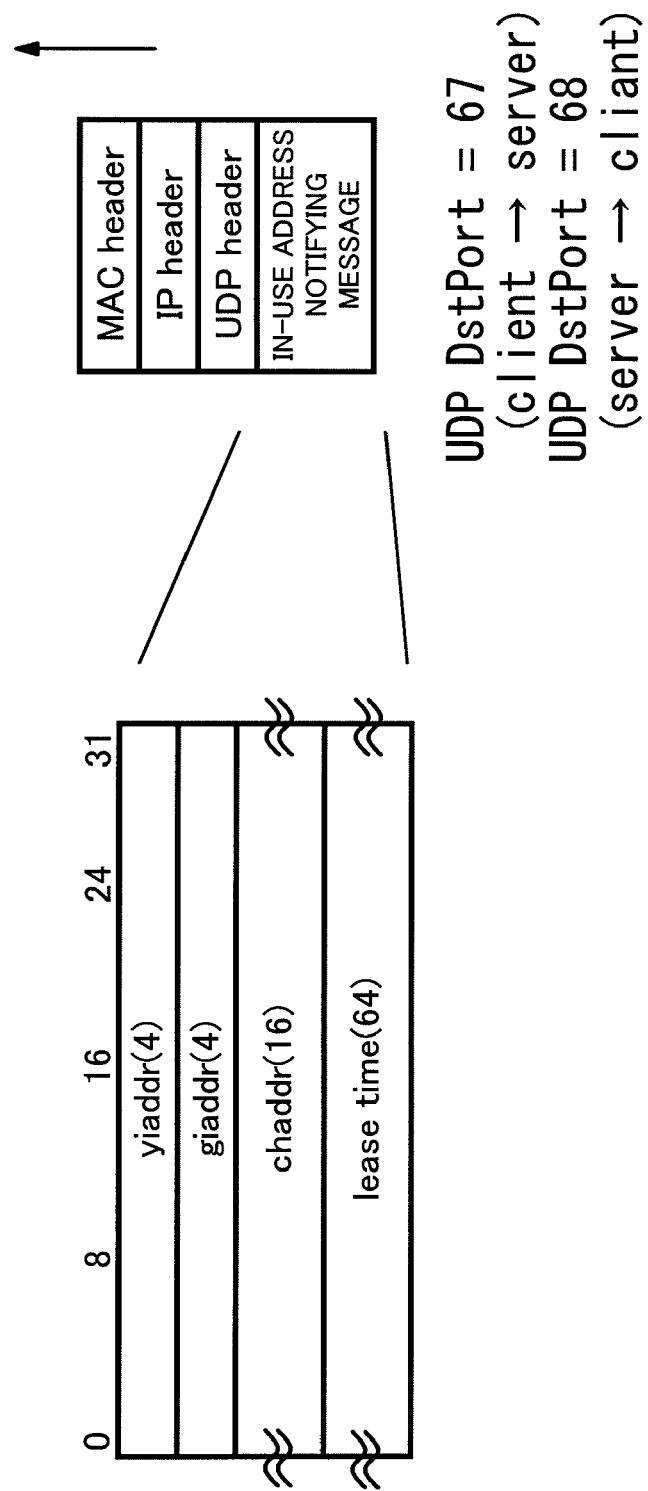
FIG. 8 is a diagram showing a message format of an in-use address notifying message.

The in-use address learning unit 242 of the proxy DHCP server 145 is notified of this information (SQ1018). FIG. 8 is a diagram showing a message format on the occasion of notifying of the in-use address. FIG. 9 is an explanatory table showing definitions of respective fields in the message format on the occasion of notifying of the in-use address. The message on the occasion of notifying of the in-use address has the fields such as yiaddr, giaddr, chaddr and lease time.

The in-use address learning unit 242 of the proxy DHCP server 145 notified of the in-use address registers the address in-use state in the in-use address management database 248 (SQ1020). The in-use address management database 248 is the very database possessed by the existing common DHCP server.

Figure 10:
FIG. 10 is a diagram showing an example of an in-use address management database.

FIG. 10 is a diagram showing an example of a database format. Each row in FIG. 10 corresponds to one record in the in-use address management database 248. These records are sorted according to the extended relay Agent and are thus stored. Each of the records in the in-use address management database 248 has items (fields) such as a client terminal MAC address, an assigned IP address, lease start time and lease end time. The lease end time may be replaced by a lease period etc.

FIG. 11 is a diagram showing an example of definition of an IP address pool space. FIG. 11 illustrates that an IP address [192.168.0.2-9] is assigned to a subnet in which the extended relay Agent 150 having an IP address [192.168.0.1] exists. Similarly, an IP address [192.168.1.2-9] is assigned to a subnet in which the extended relay Agent 150 having an IP address [192.168.1.1] exists. An IP address [192.168.2.2-9] is assigned to a subnet in which the extended relay Agent 150 having an IP address [192.168.2.1] exists.

Figure 12:
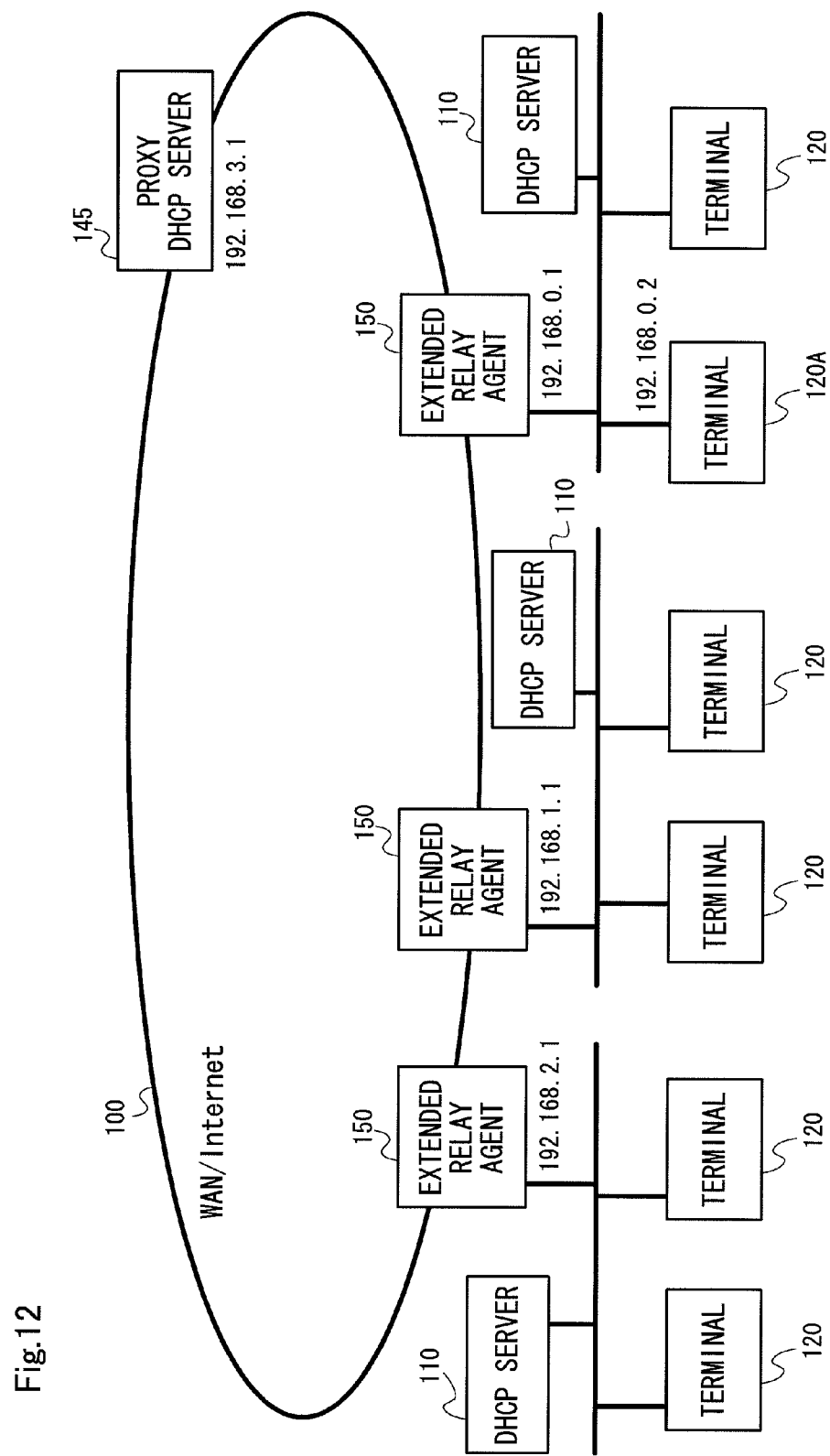
FIG. 12 is a diagram showing an example of the network architecture.

FIG. 12 is a diagram illustrating an example of the network architecture when the IP address is assigned to the terminal A (120A) as illustrated in FIG. 10 in the network where the IP address pool space is defined as in FIG. 11. In FIG. 12, an IP address [192.168.3.1] is assigned to the proxy DHCP server.

Referring back to FIG. 3, the terminal A (120A) desiring to extend the lease period of the IP address sends the Request message to the DHCP server 110A (SQ1022). The DHCP server 110A, upon receiving the Request message for extending the lease period from the terminal A (120A), makes a response by the ACK message (SQ1024). Through this operation, the lease period of the IP address leased to the terminal A (120A) is extended.

The lease period extension checking unit 244 of the proxy DHCP server 145, when confirming expiration of the lease period of each of the IP addresses registered in the in-use address management database 248 (SQ1026), transmits an ICMP (Internet Control Message Protocol) Echo Request packet (SQ1028). If a response is given (SQ1030), it is determined that the lease period is renewed, and the lease end time in the in-use address management database 248 is extended (SQ1032). Whereas none of the response is given, the entry concerned is deleted from the in-use address management database 248.

(Post-Occurrence of Fault)

Next, a description about the post-occurrence of the fault will be made with reference to FIG. 4. An assumption is that the fault occurs in the DHCP server 110A (e.g., the DHCP server 110A stops operating) on a certain LAN shown in FIG. 1. In the extended relay Agent 150, when the fault detecting unit 234 receives (SQ2004) a request (SQ2002) of a terminal B (120B) for the DHCP server 110A and nevertheless if there is no response to this request (SQ2006), the fault detecting unit 234 determines that the fault occurs in the DHCP server 110A, thus detecting the occurrence of the fault. A period of waiting time for the fault detecting unit 234 to determine the occurrence or non-occurrence is set to, e.g., 10 sec.

The fault detecting unit 234 detecting the occurrence of the fault instructs the DHCP transferring unit 236 to start transferring the DHCP packet to the proxy DHCP server 145 (SQ2008). Further, the fault detecting unit 234 instructs the in-use address notifying unit 232 to stop notifying the in-use address learning unit 242 of the proxy DHCP server 145, of the assigned address information (SQ2010).

The DHCP transferring unit 236 receiving the instruction starts the existing relay Agent function. Specifically, the DHCP transferring unit 236 forwards the packet, specified by the intra-LAN UDP DstPort=67, to the preset proxy DHCP server 145. A transfer message format is the same as the DHCP-based message format (FIG. 5). The extended relay Agent 150 enters the IP address of the extended relay Agent 150 into the giaddr field in the DHCP message. Moreover, the extended relay Agent 150 updates the source IP header with the extended relay Agent 150 and the destination IP header with the proxy DHCP server 145, and then transmits the thus-updated message by unicast. With this operation, the request (SQ2012) of the terminal B (120B) for the DHCP server 110A is, though any response is not given from the DHCP server 110A, received by the DHCP transferring unit 236 (SQ2014) and forwarded to the proxy DHCP server 145.

The proxy DHCP server 145, when receiving the DHCP packet from the extended relay Agent 150 (SQ2016), performs the operation (operates as the standby system) of assigning the IP address in the same way as the existing common DHCP server unit operates. The database employed on this occasion is the in-use address management database 248 built up by the in-use address notifying unit 232 and the lease period extension checking unit 244. The common DHCP server unit 246 checks the in-use address management database 248 (SQ2018). The common DHCP server unit 246 determines the IP address leased to the terminal B (120B), and notifies (SQ2022) the terminal B (120B) of this IP address via the DHCP transferring unit 236 (SQ2020).

(Post-Recovery from Fault)

Thereafter, as illustrated in FIG. 4, it is assumed that the DHCP server 110A on the LAN is recovered from the fault. In the extended relay Agent 150, the fault detecting unit 234 receives (SQ2026) the request (SQ2024) for the DHCP server 110A from the terminal 120, and detects the recovery from the fault at a point of time when recognizing (SQ2030) that a response (SQ2028) to this request is given from the DHCP server 110A. The fault detecting unit 234 instructs the DHCP transferring unit 236 to stop forwarding the DHCP packet to the proxy DHCP server 145 (SQ2032), and instructs the in-use address notifying unit 232 to start notifying the in-use address learning unit 242 of the proxy DHCP server 145, of the assigned address information (SQ2034).

After being recovered, the DHCP server 110A on each LAN, though not capable of knowing the in-use IP address, avoids a risk of repeatedly assigning the in-use IP address owing to the following conventional function. Namely, when receiving the address assignment request from the terminal 120, the DHCP server 110A checks based on an ARP (Address Resolution Protocol) request whether the address to be assigned from now is used within the LAN or not. If there is no ARP response, the IP address is not yet used and is therefore assigned to the terminal 120. If the ARP response is given, another IP address is set as an assignment target address.

<Effect of the Embodiment>

According to the present embodiment, the DHCP server 110 exists on the subnet 105, and hence the response made in the case of the IP address acquisition request being made does not decline. Further, the single DHCP server 110 is disposed in each subnet 105, and therefore the cost gets lower than in the case of disposing two DHCP servers, i.e., the active server and the standby server, in each subnet.

Second Embodiment

A second embodiment will discuss a mode of using a request message format given from the existing relay Agent as a message format on such an occasion that the in-use address notifying unit 232 notifies the proxy DHCP server 145 of the assigned address information in the first embodiment. The second embodiment has the common points to the first embodiment. Accordingly, the discussion will be focused on different points, and the explanations of the common points are omitted.

The network architecture is the same as in the first embodiment (FIG. 1).

Figure 13:
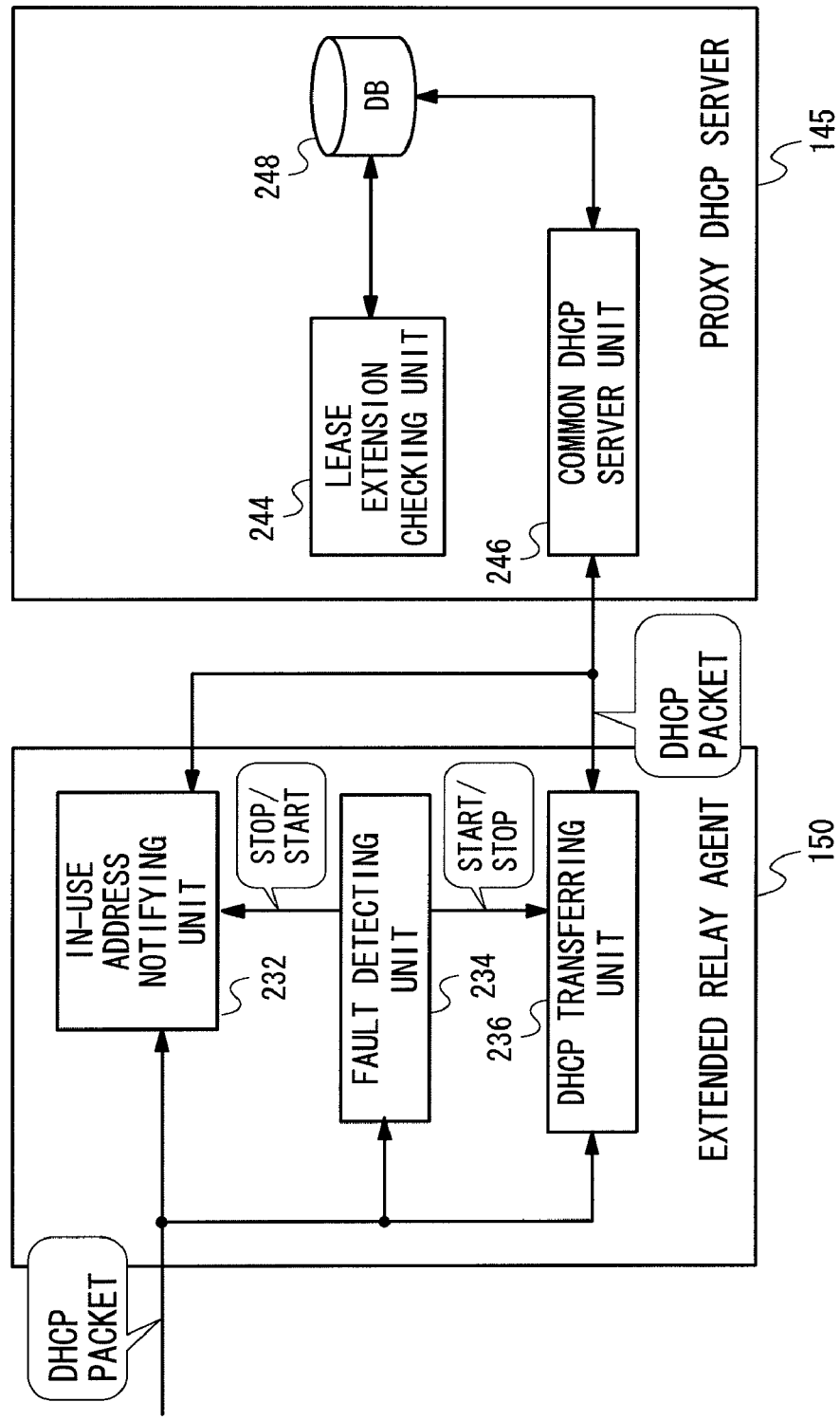
FIG. 13 is a diagram showing an example of configurations of the extended relay Agent and the proxy DHCP server in a second embodiment.

FIG. 13 is a diagram showing examples of configurations of the extended relay Agent 150 and of the proxy DHCP server 145 in the second embodiment.

The in-use address notifying unit 232 of the extended relay Agent 150 transmits the following DHCP message to the common DHCP server unit 246 of the proxy DHCP server 145.

The message format of the assigned address information transmitted to the proxy DHCP server 145 is the same as the existing DHCP message in FIG. 5. A MAC address of the terminal 120 (e.g., the terminal A (120A) shown in FIG. 1) assigned the IP address is stored in the chaddr field of the DHCP message. The IP address of which to notify as an address leased to the terminal A (120A), is stored in a [request IP address] option field of the DHCP message. The lease period information is stored in the [lease period] option field of the DHCP message.

Further, the extended relay Agent 150 renews (reassembles) the DHCP packet into a unicast packet addressed to the proxy DHCP server 145 in the same way as the existing relay Agent does, and then forwards the unicast packet to the proxy DHCP server 145.

The common DHCP server unit 246 of the proxy DHCP server 145 receiving the request message operates as if receiving the request for the want-to-use IP address and the lease period directly from the terminal A (120A). Namely, the common DHCP server unit 246 registers, in the in-use address management database 248, the notified IP address entered in the [request IP address] option field, and further sends a response message by unicast back to the extended relay Agent 150.

In the extended relay Agent 150 receiving the response message, the in-use address notifying unit 232 receives this response message, then recognizes that the message is the response corresponding to the request described above by observing the same field as of the fault detecting unit 234, and discards this message. If none of the fault occurs in the DHCP server 110, the in-use address notifying unit 232 starts operating, while the DHCP transferring unit 236 stops operating. Whereas if the fault occurs in the DHCP server 110, however, the in-use address notifying unit 232 stops operating, while the DHCP transferring unit 236 starts operating, and hence the DHCP transferring unit 236 receives the message and executes the existing transfer process.

The proxy DHCP server 145 according to the second embodiment eliminates the necessity for the in-use address learning unit 242 of the proxy DHCP server 145 in the first embodiment, whereby the proxy DHCP server 145 can be simplified.

Third Embodiment

A third embodiment will discuss a mode in which the fault detecting unit 234 detects the fault of the DHCP server 110 through ICMP (Internet Control Message Protocol) Echo Request/Reply with respect to the in-use IP address. The third embodiment has the common points to the first embodiment. Accordingly, the discussion will be focused on different points, and the explanations of the common points are omitted.

The network architecture and the functional configurations are the same as in the first embodiment (FIGS. 1 and 2).

The fault detecting unit 234 (FIG. 2) of the extended relay Agent 150 refers to the intra-LAN DHCP packet and thus recognizes the IP address of the DHCP server 110. The fault detecting unit 234 transmits ICMP Echo to the IP address of the DHCP server 110. Thereafter, if ICMP Echo Reply is not received within a fixed period of time, the fault detecting unit 234 determines that the fault occurs.

According to the third embodiment, the fault detecting unit 234 transmits an ICMP-based status check message (ICMP Echo) to the DHCP server 110. If the DHCP server 110 is normal, the fault detecting unit 234 can receive the response message (ICMP Echo Reply) thereto. Whereas if the DHCP server 110 is abnormal (with the fault), the fault detecting unit 234 is disabled to receive the response message within the predetermined period. The fault of the DHCP server 110 is detected from not receiving this response message. This contrivance enables the fault of the DHCP server 110 to be detected without monitoring the DHCP packet flowing across the LAN at all times.

Fourth Embodiment

A fourth embodiment will discuss a mode in which the fault detecting unit detects the fault of the DHCP server by monitoring not the DHCP Request/Reply but ARP (Address Resolution Protocol) Request/Reply with respect to the in-use address. The ARP is a protocol for knowing (obtaining) the MAC address from the IP address. The fourth embodiment has the common points to the first embodiment. Accordingly, the discussion will be focused on different points, and the explanations of the common points are omitted.

The network architecture and the functional configurations are the same as in the first embodiment (FIGS. 1 and 2).

The fault detecting unit 234 (FIG. 2) of the extended relay Agent 150 refers to the intra-LAN DHCP packet and thus recognizes the IP address of the DHCP server 110. The fault detecting unit 234 sends the ARP Request to the IP address of the DHCP server 110. Thereafter, if none of the ARP Reply is received within a fixed period of time, the fault detecting unit 234 determines that the fault occurs.

According to the fourth embodiment, the fault detecting unit 234 determines, from the reception/non-reception of the ARP Reply to the ARP Request, whether or not the fault occurs in the DHCP server 110. This contrivance enables the fault of the DHCP server 110 to be detected without monitoring the DHCP packet flowing across the LAN at all times.

Fifth Embodiment

A fifth embodiment will discuss a mode in which the proxy DHCP server notifies the DHCP server of contents of the in-use address management database so as not to do the ARP-based check about the in-use IP address each time when the DHCP server recovers. The fifth embodiment has the common points to the first embodiment. Accordingly, the discussion will be focused on different points, and the explanations of the common points are omitted.

Figure 14:
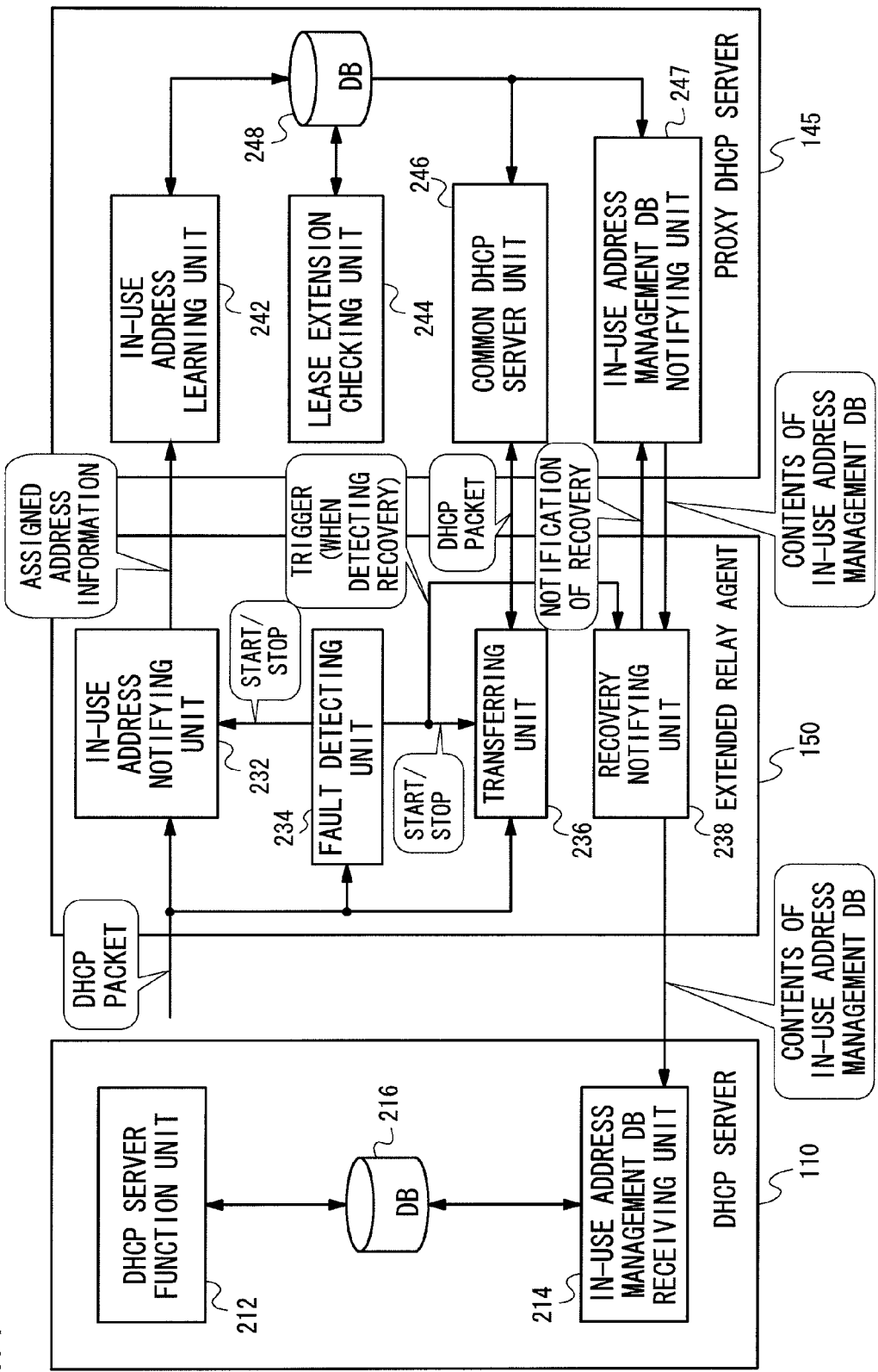
FIG. 14 is a diagram showing an example of configurations of the extended relay Agent and the proxy DHCP server in a fifth embodiment.

The network architecture is the same as in the first embodiment (FIG. 1). FIG. 14 is a diagram illustrating the DHCP server 110, the extended relay Agent 150 and the proxy DHCP server 145 in the fifth embodiment.

The fifth embodiment has an addition of the following configuration to the configuration in the first embodiment.

The extended relay Agent 150 further includes a recovery notifying unit 238. The recovery notifying unit 238 notifies the proxy DHCP server 145 that the DHCP server 110 is recovered.

The proxy DHCP server 145 further includes an in-use address management DB notifying unit 247. The in-use address management DB notifying unit 247 notifies the extended relay Agent 150 of contents of the in-use address management database 248 of the proxy DHCP server 145.

The DHCP server 110 has an in-use address management DB receiving unit 214 and an in-use address management database 216. The in-use address management DB receiving unit 214 stores the notified contents of the in-use address management database 248 in the in-use address management database 216 within the DHCP server 110.

Namely, the fault detecting unit 234 of the extended relay Agent 150, upon detecting the recovery of the DHCP server 110, notifies the recovery notifying unit 238 of this detection. The recovery notifying unit 238 notifies the proxy DHCP server 145 of the recovery of the DHCP server 110.

In the proxy DHCP server 145 receiving the recovery notification, the in-use address management DB notifying unit 247 sends notification of the contents of the in-use address management database for the extended relay Agent 150 to "giaddr" (entered with the IP address of the extended relay Agent 150) in the message.

The recovery notifying unit 238 in the extended relay Agent 150 receiving the notification notifies the intra-LAN DHCP server 110 of the contents of the in-use address management database.

The in-use address management DB receiving unit 214 in the DHCP server 110 stores the notified contents of the in-use address management database in the in-use address management database 216 of the unit 214 itself.

The fifth embodiment has no necessity of performing the ARP-based check about the in-use IP address each time when the DHCP server 110 recovers from the fault.

Sixth Embodiment

A sixth embodiment will discuss a mode of organizing several LANs into groups, installing the proxy DHCP server for every group, and thus reducing a processing load per proxy DHCP server as compared with a case of installing only one proxy DHCP server on the whole. The sixth embodiment has the common points to the first embodiment. Accordingly, the discussion will be focused on different points, and the explanations of the common points are omitted.

Figure 15:
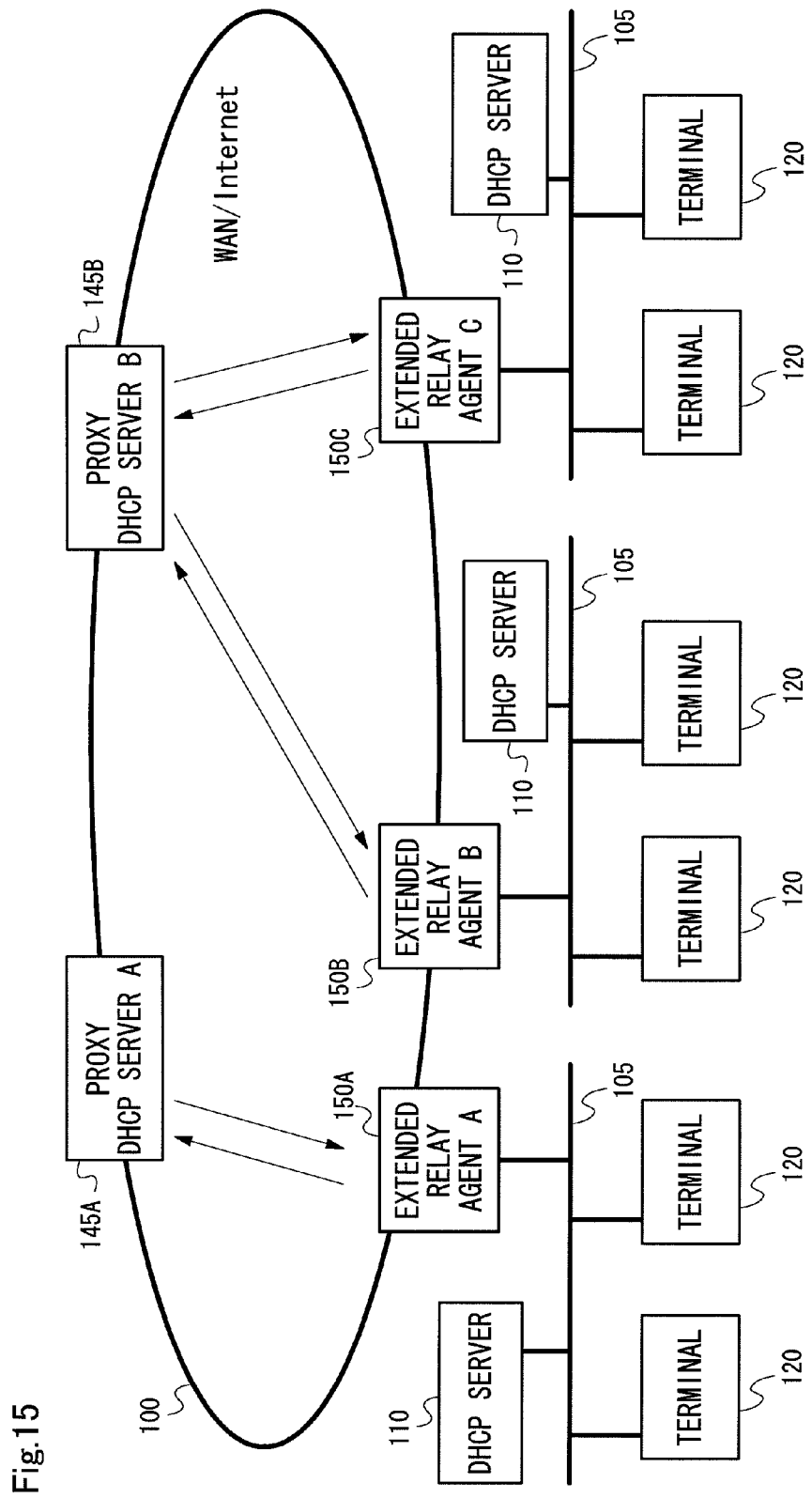
FIG. 15 is a diagram showing an example of configurations of the extended relay Agent and the proxy DHCP server in a sixth embodiment.
Figure 16:
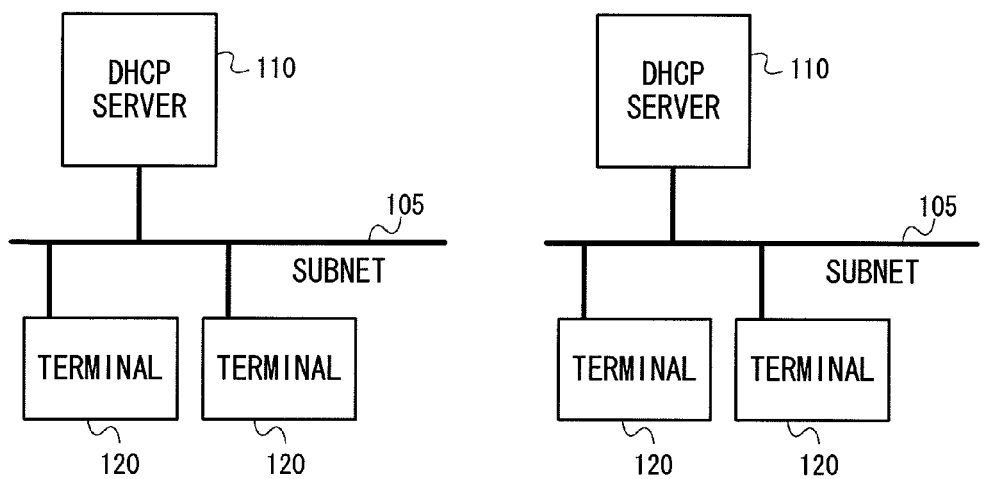
FIG. 16 is a diagram showing a conventional DHCP-based operation mode <1>.
Figure 17:
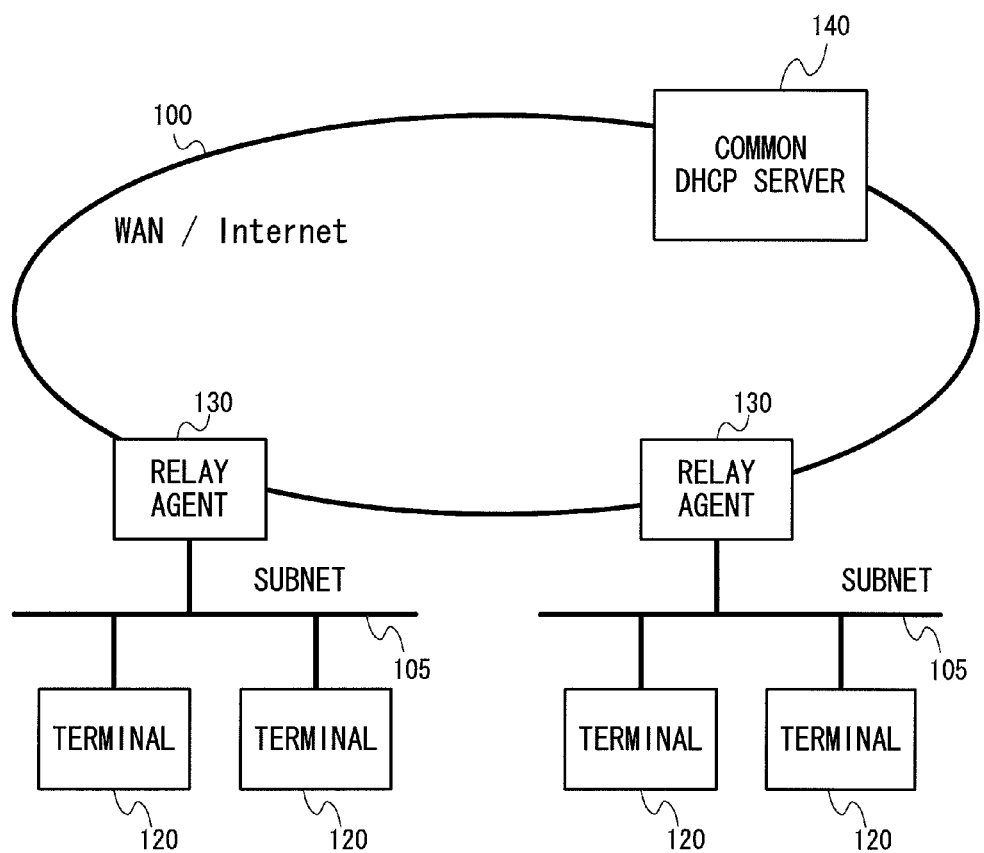
FIG. 17 is a diagram showing a conventional DHCP-based operation mode <2>.
Figure 18:
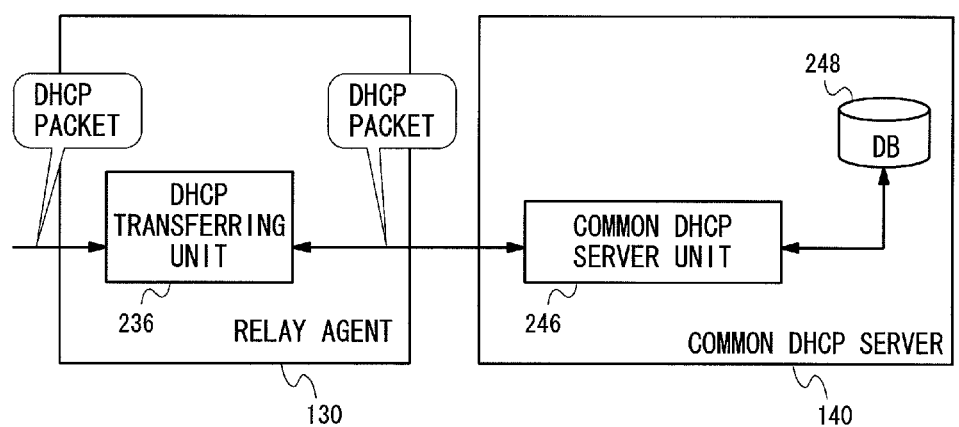
FIG. 18 is a diagram showing an example of configurations of the extended relay Agent and the proxy DHCP server in the prior art.
Figure 19:
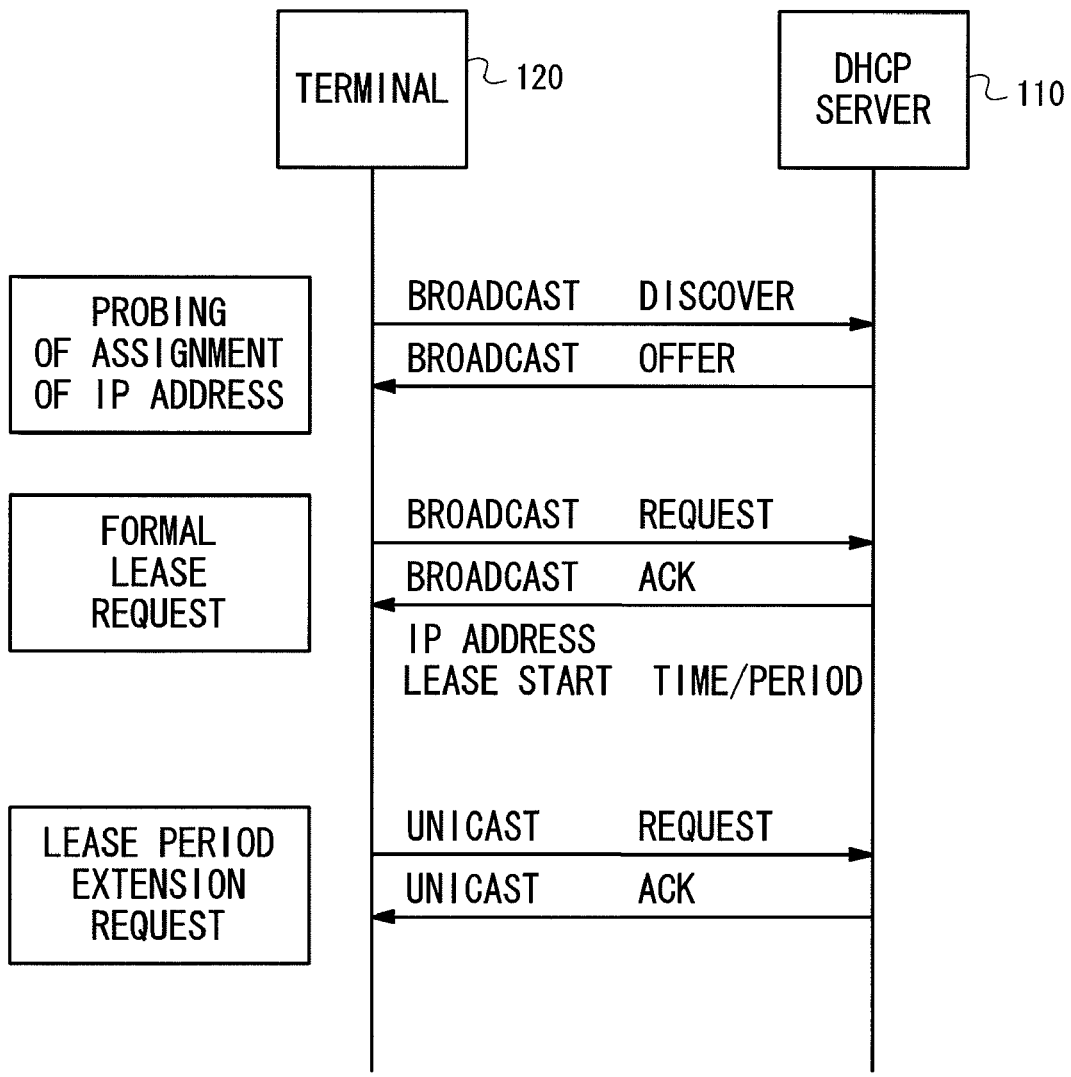
FIG. 19 is a diagram showing a DHCP-based operation mode operating sequence in the conventional DHCP-based operation mode <1>.
Figure 20:
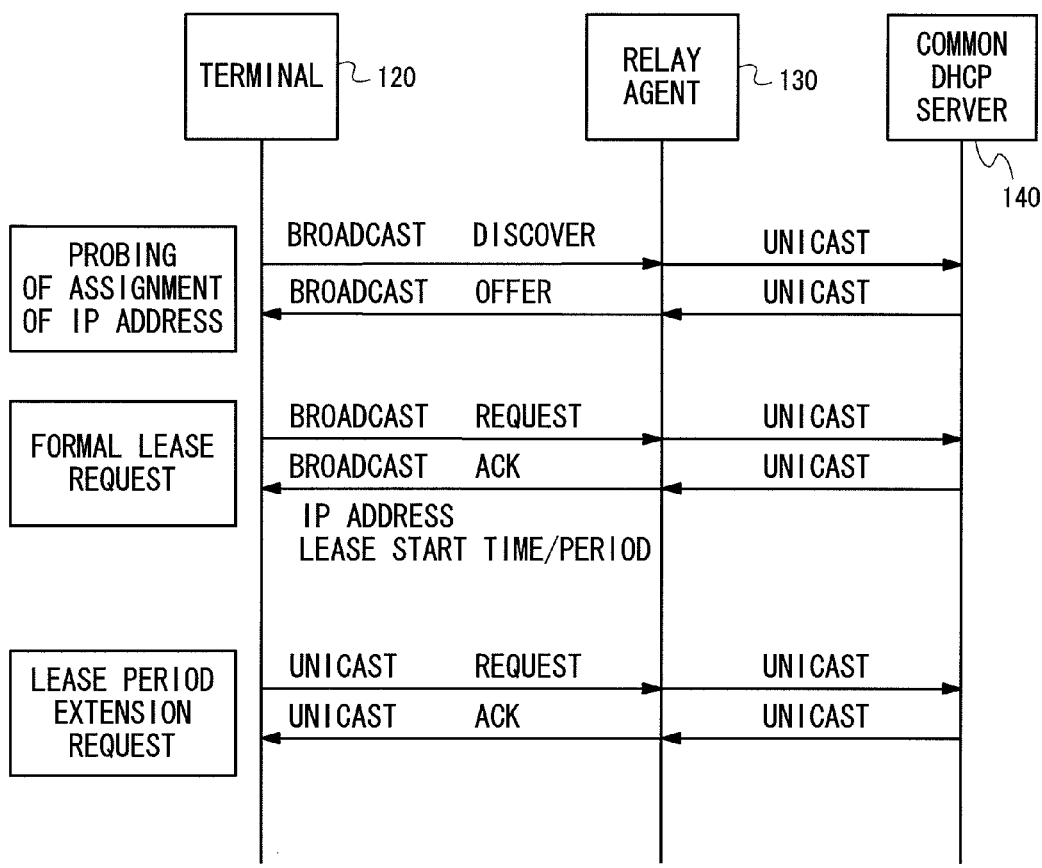
FIG. 20 is a diagram showing a DHCP-based operation mode operating sequence in the conventional DHCP-based operation mode <2>.
Figure 21:
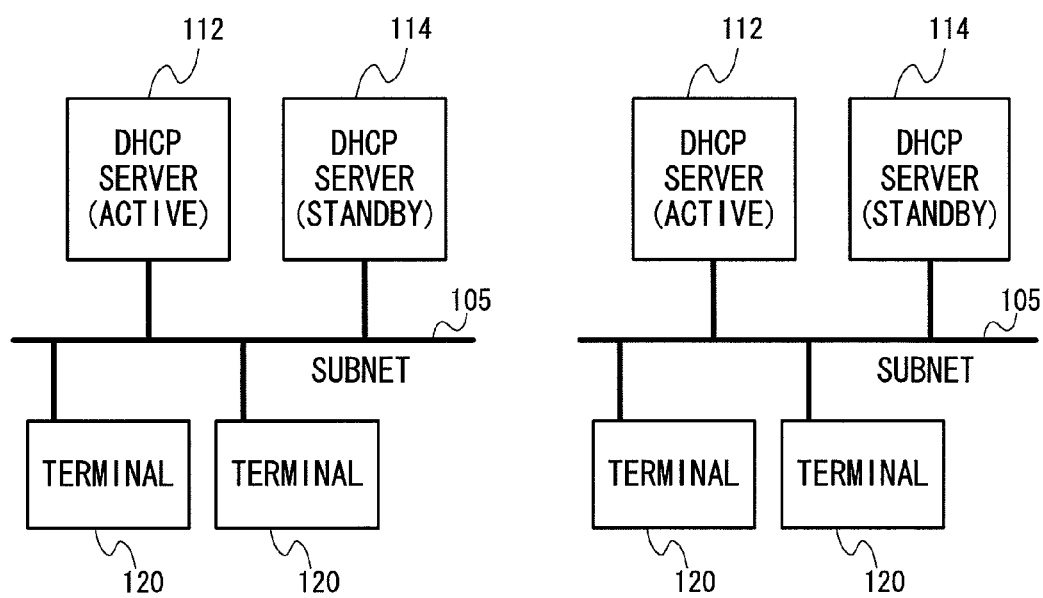
FIG. 21 is a diagram showing a conventional DHCP server redundancy approach <1>.
Figure 22:
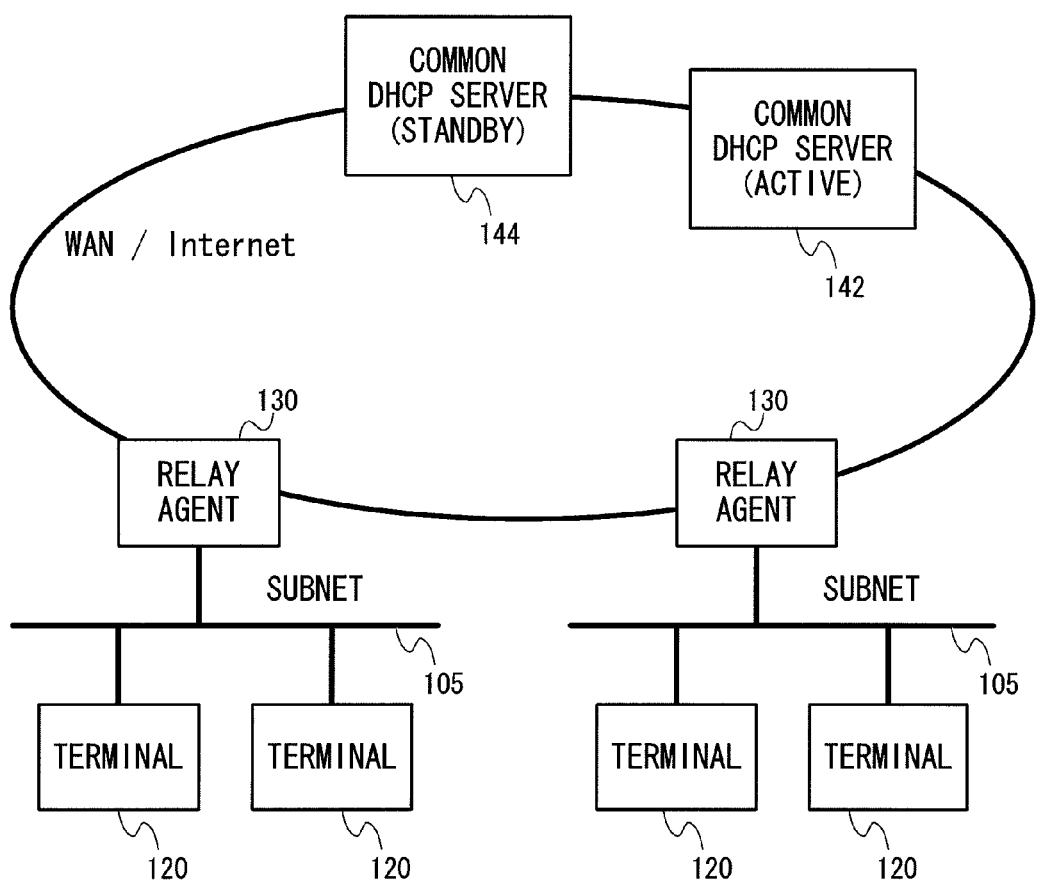
FIG. 22 is a diagram showing a conventional DHCP server redundancy approach <2>.

FIG. 15 is a diagram showing an example of the network architecture in the sixth embodiment.

The extended relay Agent A (150A) is set beforehand to communicate with the proxy DHCP server A(145A). Further, an extended relay Agent B(145B) and a next ended relay Agent C(145C) are previously set to communicate with the proxy DHCP server B(145B).

The sixth embodiment enables the reduction of the processing load per proxy DHCP server by preparing the plurality of proxy DHCP servers.

<Incorporation by Reference>

The disclosures of Japanese patent application No. JP 2006-245744 filed on Sep. 11, 2006 including the specification, drawings and abstract are incorporated herein by reference.

What is claimed is:

1. A relay agent device disposed in one of a plurality of subnets, each subnet containing terminal devices and an address leasing device, the address leasing device performing an address lease service for the terminal devices, comprising:

a notifying unit notifying a proxy address leasing device, disposed in a network employed in common between the plurality of subnets, of address lease state information about the terminal devices, each address lease state information containing an IP (Internet Protocol) address of a terminal, an IP address of the relay agent device, and a MAC address of the terminal and lease time;

a detecting unit detecting a fault in the address leasing device; and a transfer unit transferring a message related to the address lease, received from the terminal device in the subnet, to the proxy address leasing device in the network, and transferring a message related to the address lease, which is addressed to the terminal in the subnet from the proxy address leasing device in the network, to the terminal in the subnet, in order for the proxy address leasing device in the network to take over an IP address lease service provided by the address leasing device in the subnet when the fault is detected.

2. A relay agent device according to claim 1, wherein the notifying unit notifies the proxy address leasing device of the address leased to the terminal from the address leasing device in order to manage the address as information used by the proxy address leasing device at a take-over time.

3. A relay agent device according to claim 1, wherein the transfer unit transfers, to the terminal, a message for querying the terminal about a continuous use of the address that is transmitted from the proxy address leasing device when a lease period of the address leased to the terminal expires, and transferring a response message to the query message sent from the terminal to the proxy address leasing device.

4. A relay agent device according to claim 1, wherein the address leasing device and the proxy address leasing device are DHCP servers that lease the DHCP-based (Dynamic Host Configuration Protocol based) IP addresses to the terminals, and the notifying unit registers, in a DHCP-based message, the IP address leased to the terminal by the address leasing device, and notifies the proxy address leasing device of the message.

5. A relay agent device according to claim 1, wherein the detecting unit monitors the message for leasing the address that is transferred and received between the address leasing device and the terminal, and, if the address leasing device does not respond to the message given from the terminal, detects that the fault occurs in the address leasing device.

6. A relay agent device according to claim 1, wherein the detecting unit sends a status check message to the address leasing device, and, if the address leasing device does not respond to the status check message, detects that the fault occurs in the address leasing device.

7. A relay agent device according to claim 1, wherein the detecting unit sends an address query message to the address leasing device, and, if the address leasing device does not respond to the address query message, detects that the fault occurs in the address leasing device.

8. A relay agent device according to claim 1, further comprising a recovery notifying unit notifying, when detecting that the address leasing device is recovered from the fault, the proxy address leasing device of the recovery, and notifying the address leasing device of an address lease state of the proxy address leasing device that is sent from the proxy address leasing device, corresponding to the notification of the recovery.

9. A relay agent device according to claim 1, wherein the relay agent device is connected to one of a plurality of proxy address leasing devices.

10. A relay agent device according to claim 1, wherein the communication unit acquires the address lease state from the message that is sent and received by broadcast between the terminal and the address leasing device in one of the networks.

11. A proxy address leasing device connected via a relay agent device to a network including terminals and an address leasing device providing an address lease service to the terminals, comprising:

a learning unit learning, if a fault does not occur in the address leasing device, an address lease state of the address leasing device with respect to a terminal, which is transferred via the relay agent device;

a storage unit storing the address lease state; and a proxy unit taking over the address lease service of the address leasing device by performing communications for leasing the address with the terminal via the relay agent device based on learning contents of the learning unit and the address lease state stored in the storage unit.

12. A proxy address leasing device according to claim 11, wherein the storage unit stores the address lease state including the address leased to the terminal.

13. A proxy address leasing device according to claim 12, wherein the proxy unit:

sends, when reaching expiration of a lease period of the address leased to the terminal stored in the storage unit, a query message about an extension of the address lease period to the terminal via the relay agent device, receives a response message to the query message from the terminal via the relay agent device, and updates the address lease state stored in the storage unit in response to a content of the response message.

14. A proxy address leasing device according to claim 11, further comprising a notifying unit notifying, when the relay agent device notifies of a recovery from the fault of the address leasing device, the address leasing device of the address lease state stored in the storage unit via the relay agent device.

15. A proxy address leasing device according to claim 14, further comprising a receiving unit receiving the address lease state stored in the storage unit via the relay agent device.

* * * * *